United States Patent Office 3,449,336
Patented June 10, 1969

3,449,336
PROCESS FOR PREPARING NOVEL INTERMEDIATES USEFUL FOR PREPARING 7-AMINO-CEPHALOSPORANIC ACID AND DERIVATIVES THEREOF
Robert Burns Woodward, 12 Oxford St.,
Cambridge, Mass. 02138
No Drawing. Filed Aug. 22, 1966, Ser. No. 573,876
Claims priority, application Switzerland, Dec. 9, 1965, 16,980/65, 16,981/65; Jan. 13, 1966, 452/66, 453/66
Int. Cl. C07d 99/24, 93/10, 99/00
U.S. Cl. 260—243
11 Claims

ABSTRACT OF THE DISCLOSURE

The invention which is being claimed includes the procedure of: (1) reducing the formyl group to a hydroxymethyl group in 7-amino-3-desacetyloxymethyl-3-formyl-isocephalosporanic acid (or a derivative thereof) by treatment with a boron hyride, and (2) isomerizing said 7-amino-desacetyl-isocephalosporanic acid (or a derivative thereof) by treatment with a weakly basic reagent in an anhydrous medium. The products obtained are useful in the synthesis of 7-amino-cephalosporanic acid.

Also included in the invention which is being claimed are compounds specifically or generically included in the formula and useful as intermediates for the synthesis of 7-amino-cephalosporanic acids and their derivatives:

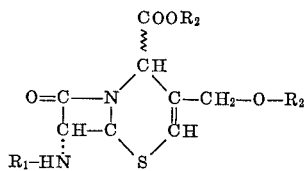

in which $R_1$ and $R_2$ are selected from the group consisting of hydrogen and acyl, and $R_a$ is selected from the group consisting of 2,2,2-trichloroethyl and phenyl-lower alkyl.

The present invention relates to a methodological process for the manufacture of 7-amino-desacetyl-isocephalosporanic acid compounds, and the corresponding cephalosporanic acid compounds, which process is used for the manufacture of valuable intermediate products and was also used in the first synthetic preparation of 7-amino-cephalosporanic acid and the derivatives thereof, for which purpose it is specially suitable.

7-amino-cephalosporanic acid has the following Formula XVI

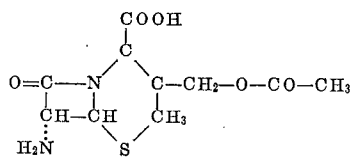

XVI

The derivatives are primarily N-acyl compounds, in which the acyl radicals are, in particular, those of effective N-acyl derivatives of 7-amino-cephalosporanic acid, such as a thienylacetyl, for example, 2-thienylacetyl, cyanoacetyl, chloroethylcarbamyl or phenylacetyl radical, or easily eliminable radicals, for example, the radical of a semiester of carbonic acid, for example, the tertiary-butyl-oxycarbonyl radical.

The synthesis of this important compound, which is of great value in the preparation of medicaments, and the derivatives thereof is based on the idea of using a 3,5-unsubstituted, 2,2-disubstituted thiazolidine-4-carboxylic acid as starting material, for example, a compound of the Formula I

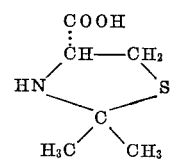

I.

and carrying out the novel synthesis, for example, according to the following scheme of formulae:

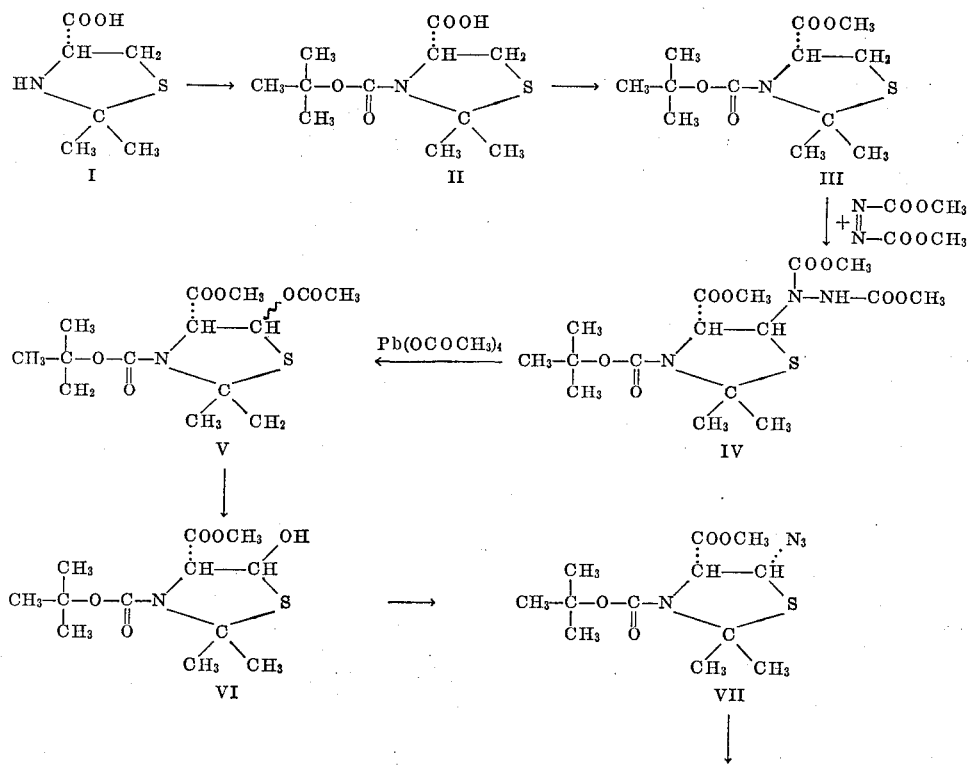

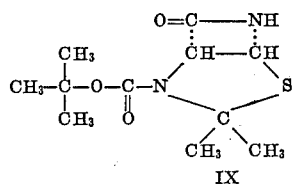
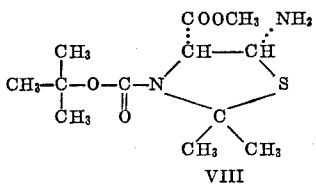

The Compound IX is converted into the desired 7-amino-cephalosporanic acid and its derivatives as follows:

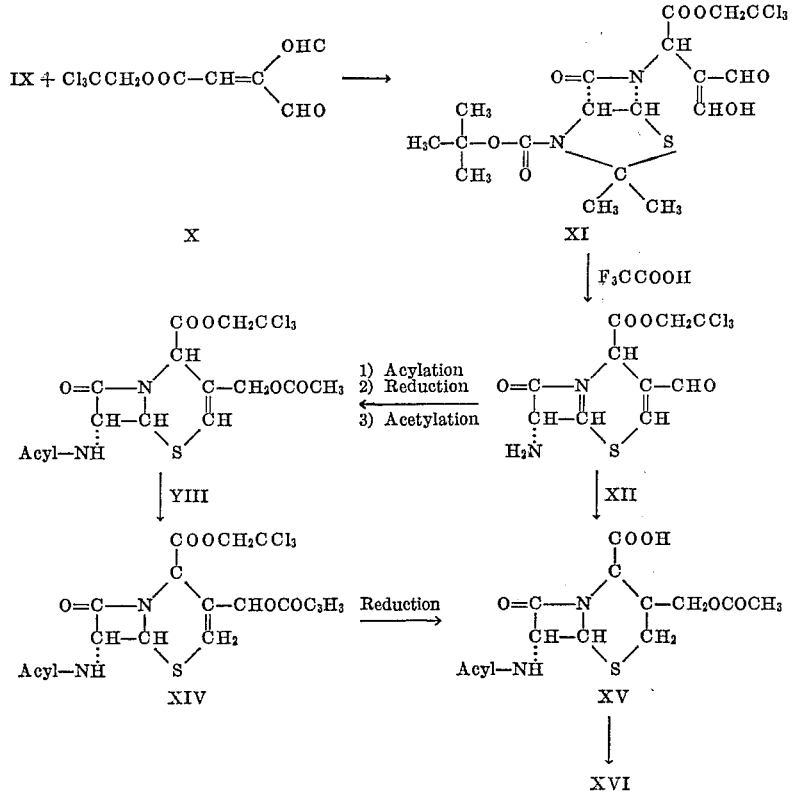

The compounds of the Formula X which is being used as intermediate product is prepared as follows:

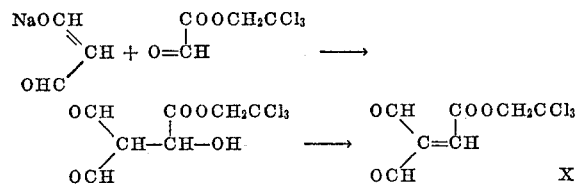

The above-mentioned valuable compounds are surprisingly prepared by reducing the formyl group in a 7-amino - 3 - desacetyloxy-methyl - 3 - formyl-isocephalosporanic acid or a derivative thereof, such as in a compound of the Formula XII, to a hydroxymethyl group and, if desired, isomerizing a resulting 7-amino-desacetyl-isocephalosporanic acid or an O-acyl derivative and/or an N-acyl derivative thereof or an acid derivative of such a compound, such as, for example, a compound of the Formula XIII, and isolating the desired 7-amino-desacetyl-cephalosporanic acid or derivative thereof, for example, an O-acyl and/or N-acyl derivative thereof, or an acid derivative, such as, an ester of such a compound, for example, a compound having one of the Formulae IXV, XV or XVI and, if desired, converting in a resulting compound a substituent into another substituent, and/or if desired, separating a mixture of isomers obtained into the single isomers.

Derivatives of the starting materials are primarily esters of the carboxyl group and/or acyl derivatives of the amino group. The esters are those with alcohols, such as aliphatic or araliphatic alcohols and are primarily alkyl esters, for example, lower alkyl esters, such as methyl, ethyl, n-propyl, isopropyl, n-butyl or tertiary butyl esters, or phenyl-lower alkyl esters, such as benzyl or diphenylmethyl esters. The alcohol radicals of these esters are unsubstituted, but they may be substituted, for example, by lower alkyl groups, such as methyl, ethyl or isopropyl groups, or lower alkoxy groups, such as methoxy or ethoxy groups, nitro or trifluoromethyl groups, or, especially, halogen atoms, such as chlorine, fluorine or bromine atoms; substituted alcohol radicals that are especially preferred are halogenated lower alkyl groups, for example, 2,2,2-trichloroethyl groups.

The acyl radicals present in the acyl derivatives of the amino group are primarily those which are present in pharmacologically active N-acyl derivatives of the 7-amino-cephalosporanic acid, for example, a thienylacetyl, e.g., 2-thienylacetyl, chloroethylcarbamyl, phenylacetyl or a 5-amino-5-carboxyvaleryl radical, in which functional groups, such as the amino or carboxyl group may be protected, or easily eliminable acyl radicals, for example, the radical of a semi-ester of carbonic acid, such as a tertiary butyloxycarbonyl radical, or any other suitable acyl radical, such as a benzoyl radical or a substituted benzoyl radical, for example, 4-nitrobenzoyl.

Reduction of the formyl group into the hydroxymethyl group in accordance with the invention is preferably carried out with reducing hydrides, preference being given to those that do not or only slowly reduce an ester or an amide function present. Reagents of this kind are primarily boron hydrides, for example, sodium boron hydride, lithium boron hydride, zinc boron hydride and especially diborane, as well as lithium tri-lower alkoxy-aluminium hydrides, for example, lithium-tri-tertiary-butyloxy-aluminium hydride. Reduction can also be brought about with catalytically activated hydrogen, for example, in the presence of a palladium catalyst, such as palladium on a carrier material, for example, calcium carbonate, strontium carbonate or barium sulphate, or with aluminium-tri-lower alkoxide, for example, aluminium-tri-isopropylate or aluminium-tri-tertiary-butylate, in the presence of a suitable alcohol, such as isopropanol, or photo-chemically, for example, by means of light in the presence of benzhydrol, isopropanol or mercaptans, or by some other suitable process.

The reaction may be carried out in the absence of a diluent, but preferably in the presence of a solvent, if necessary, with cooling or heating, in an inert gas atmosphere, and/or in a closed vessel under increased pressure. Hydride reducing agents, which are generally used in a small excess, are advantageously employed in the presence of an ether, for example, diethyl ether, tetrahydrofuran, dioxane, 1,2-dimethoxyethane or diethylene glycol-dimethyl ether, and alkali metal boron hydrides also in the presence of an alcohol, for example, methanol, ethanol or isopropanol.

O-acyl derivatives in isocephalosporanic acid derivatives used in the isomerization step are esters, primarily those with organic carboxylic acids, for example, aliphatic, cycloaliphatic, aromatic, araliphatic or heterocyclic carboxylic acids of any type, for example, lower alkane carboxylic acids, such as acetic, propionic or pivalic acid, cycloalkane carboxylic acids, such as hexahydrobenzoic acid, benzoic acid, phenyl-lower alkane carboxylic acids, such as phenyl-acetic acid phenyl-lower alkene carboxylic acids, such as cinnamic acid, or pyridine, thiophene or furane carboxylic acids, as well as pyridyl-, thienyl- or furyl-lower alkane carboxylic acids, such as nicotinic, isonitotinic, thienylacetic, for example, 2-thienylacetic, or furane, for example, 2-furane carboxylic acid, as well as formic acid, semiesters of carbonic acid, for example, carbonic acid ethyl ester, or carbamic acids, for example, carmabic acid. These acids may also contain further substituents, such as lower alkyl groups, free, etherified or esterified hydroxy groups, for example, lower alkoxy, such as methoxy or ethoxy groups, or halogen, such as fluorine, chlorine or bromine atoms, trifluoromethyl groups, mercapto groups or etherified mercapto groups, such as lower alkyl marcapto, for example, methylmercapto or ethylmercapto groups, nitro groups, amino groups, carboxyl groups, functionally modified carboxy groups, for example, carbolower alkoxy, for example, carbomethoxy or carbethoxy groups, or cyano groups, or sulphonyl groups, or other suitable radicals. The O-acyl derivatives also include the inner esters, that is to say, the lactones, formed by the free carboxyl group and the free hydroxymethyl group in 7-amino-desacetyl-isocephalosporanic acid derivatives.

Acyl derivatives of the amino group in the isocephalosporanic acid compound contain as acyl residues primarily those mentioned above, including cyanoacetyl.

Isomerization of the resulting isocephalosporanic acid is, in particular, carried out by treatment with a weak basic agent. The latter is, for example, an organic nitrogen-containing base, especially a teritary heterocyclic base having aromatic characteristics, primarily bases of the pyridine type, for example, pyridine itself, as well as collidines or lutidines; also tertiary aromatic bases, for example, those of the aniline type, such as dimethyl aniline or diethyl aniline, or teritary aliphatic, azacycloaliphatic or araliphatic bases, for example, triethylamine, diisopropylethylamine, N-methylpiperidine or benzyldimethylamine. Furthermore, it is also possible to use inorganic or organic salts of bases, especially of medium-strong to strong bases with weak acids, such as sodium acetate, triethylammonium acetate or N-methylpiperidine acetate, as well as other analogous bases.

The isomerization is advantageously carried out in an anhydrous medium, in the precence or absence of a solvent, it also being possible for the bases to serve as solvents, while cooling, at room temperature or while heating, in an inert gas atmosphere and/or in a closed vessel.

Substituents in resulting compounds at the isocephalosporanic acid or the cephalosporanic acid level can be converted into other substituents according to methods in themselves known.

Thus, the hydroxymethyl group formed in the process of the invention in an isocephalosporanic acid compound, as well as a corresponding group in compounds of the cephalosporanic acid series is preferably acylated by known methods, for example, by treatment with an acid or an acid derivatives, such as an acid halide, e.g., chloride, or an anhydride, including an inner anhydride of a carboxylic acid, i.e., a ketene, or an anhydride of a carbamic or thiocarbamic acid, i.e., an isocyanate or isothiocyanate, if necessary, in the presence of a condensing agent, such as dicyclohexylcarbodiimide. Furthermore, it is also possible to form the inner ester, i.e., the lactone, in a resulting 7-amido-des-acetyl-isocephalosporanic acid or -cephalosporanic acid compound.

Furthermore, a carboxy group esterified, for example, with a 2,2,2-trihalogenated ethanol, especially 2,2,2-trichloroethanol, can be converted into the free carboxyl group by means of reducing agents. Suitable reagents are chemical reducing agents, such as nascent hydrogen, obtained, for example, by reacting metals, metal alloys or metal amalgams with hydrogen furnishing agents, such as zinc, zinc alloys, for example, zinc-copper, or zinc amalgam in the presence of acids, such as organic carboxylic acids, for example, acetic acid, or alcohols, for example, lower alkanols, alkali metal amalgams, such as sodium or potassium amalgam or aluminium amalgam, in the presence of moist ether or lower alkanols, furthermore, alkali metals, such as lithium, sodium or potassium, or alkaline earth metals, such as calcium, in liquid ammonia, if necessary, with the addition of an alcohol, for example a lower alkanol. Furthermore, 2,2,2-trihalogenoethyl, particularly 2,2,2-trichloroethyl esters may be converted into the free acids by treatment with reducing metal salts, such as chromium-II compounds, for example, chromium-II chloride or chromium-II acetate, preferably in the presence of aqueous media, containing water-miscible organic solvents, such as lower alkanols, lower alkane carboxylic acids or ethers, for example, methanol, ethanol, acetic acid, tetrahydrofuran, dioxan, ethyleneglycol dimethylether or diethyleneglycol dimethylether.

A carboxyl group esterified with a diphenylmethyl group can be liberated, for example, by a treatment with an acid reagent, such as trifluoroacetic acid.

Resulting compounds with free carboxy group can be converted for example, into their salts, for example, alkali metal, alkaline earth metal or ammonium salts, or, by treatment with complex-forming metal salts, for example, into their copper, iron, magnesium, zinc or lead salts. Free carboxy groups can be esterified by methods in themselves known, for example, by treatment with a diazo compound, such as a diazo-lower alkane, for example, diazomethane or diazoethane, as well as a phenyl-diazo-lower alkane, for example, phenyldiazomethane or diphenyldiazomethane, or by reaction with a hydroxy compound suitable for esterification, such as an alcohol, as well as a phenol or an N-hydroxy-nitrogen compound, for example, a hydroxamic acid, in the presence of an esterification agent, such as a carbodiimide, for example dicyclohexylcarbodiimide, as well as carbonyldiimidazole, or by any other known and suitable process for esterification, for example, reaction of a salt or an acid with a reactive ester of the hydroxy compound, especially alcohol and a strong inorganic acid or a strong inorganic sulphonic acid. Furthermore resulting activated esters such as esters with N-hydroxy-nitrogen compounds, or anhydrides formed with halogenated formic acid esters can be converted into other esters by reaction with other hydroxy compounds, for example, alcohols as well as phenols.

A functionally modified carboxy group in a compound obtained can be converted into another functionally modified carboxy group by methods in themselves known, for example, esterified groups by trans-esterification, such as treatment with a hydroxy compound in the presence of a transesterification catalyst into other esterified hydroxy group. Furthermore, activated esters, for example, esters with N-hydroxy-nitrogen compounds, or anhydrides formed with halogenated formic acid esters can also be converted into other esters by reaction with other hydroxy compounds, for example, alcohols.

An esterified acyloxy group can be split, for example, with basic agents or by enzymatic means; a free hydroxy group can be acylated, for example, as described above.

A free amino group in a resulting compound can be substituted by known methods; thus, it can be acylated by a treatment with acids or acid derivatives of carboxylic or sulphonic acids, such as halides, for example, chlorides, or anhydrides (including the inner anhydrides of carboxylic acids, i.e., ketenes, or of carbamic or thiocarbamic acids, i.e., isocyanates or isothiocyanates), if desired or necessary, in the presence of a suitable condensing reagent such as dicyclohexylcarbodiimide. N-acylated amino groups can be liberated, for example, by treatment with phosphorus pentachloride, followed by treatment with an alcohol, such as methanol, and splitting the resulting imino ether.

Resulting compounds are isolated in a manner known per se; mixtures of isomers obtained can be separated into the single isomers by methods in themselves known, for example, by fractional crystallization, adsorption chromatography (column or thin-layer chromatography) or by other processes. Racemates obtained can be converted into the antipodes, for example, by forming a mixture of diastereoisomeric salts with optically active salt-forming agents, separating the mixture into the diastereoisomeric salts and converting the separated salts into the free compounds or by fractional crystallization from optically active solvents.

The invention further includes any modification of the present process in which an intermediate product obtainable at any stage of the process is used as starting material and any remaining steps are carried out, or the process is discontinued at any stage thereof; furthermore, the starting materials may be used in the form of derivatives, for example, salts, or they may be formed during the reaction.

It is advantageous to select starting materials and reaction conditions that produce the compounds indicated above as being especially preferred.

The starting materials used in the above process are obtainable by the process described in application Ser. No. 573,866, filed Aug. 22, 1966.

The compounds obtained by the process of the invention are 7-amino-3-desacetyl-isocephalosporanic acids and the derivatives thereof, for example, their N- and/or O-acyl derivatives, as well as the esters of such compounds, especially compounds of the Formula XIIIa

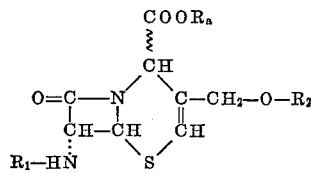

XIIIa as well as 7-amino-3-desacetyl-cephalosporanic acids and the derivatives thereof, for example, their N-acyl and/or O-acyl derivatives, as well as esters of such compounds, especially compound of the formula

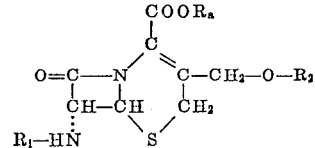

in which $R_1$ and $R_2$ each represents a hydrogen atom or an acyl group and $R_a$ represents a hydrogen atom or the radical of an alcohol.

The acyl radical $R_1$ or $R_2$ is primarily one of the above-mentioned radicals of organic carboxylic acids, whereby functional groups in such radicals, for example, in the 5-amino-5-carboxy-valeryl radical, may be protected, for example, by esterification and/or acylation. The acyl radicals $R_1$ and $R_2$ are primarily those of active O-acyl and N-acyl derivatives of 7-amino-cephalosporanic acids, the O-acyl group being primarily a lower alkanoyl group, especially acetyl groups, and N-acyl groups being primarily a thienylacetyl, such as a 2-thienylacetyl, cyanoacetyl, chloroethylcarbamyl, phenylacetyl or 5-amino-5-carboxy-valeryl radicals, functional substituents, such as amino and/or carboxyl groups, being protected, if desired.

The alcohol radicals $R_a$ are preferably unsubstituted or substituted aliphatic or araliphatic radicals and are primarily the above-mentioned lower alkyl groups or substituted lower alkyl groups, especially halogenated lower alkyl groups, as well as phenyl lower alkyl groups.

The compounds of the isocephalosporanic acid series obtained according to the procedure of the invention, for example, the esters, which are useful as intermediate products, of halogeno-lower alkanols, especially 2,2,2-trichloroethanol, or phenyl-lower alkanols, especially diphenyl-methanol, can be converted as shown above into the 7-amino-cephalosporanic acid and the derivatives thereof; the latter can be used as medicaments, especially medicaments have antibacterial properties, or as intermediate products in the manufacture of pharmacologically active compounds. Especially valuable as new intermediate products are esters of 7-amino-cephalosporanic acid and their O- and/or N-acyl derivatives with halogen-lower alkanols, especially 2,2,2-trichloroethanol.

The following examples illustrate the invention.

EXAMPLE 1

A solution of 0.07 g. of 3-desacetyl-oxymethyl-3-formyl-7-(2 - thienylacetylamino) - isocephalosporanic acid 2,2,2-trichloroethyl ester in 3 ml. of tetrahydrofuran is treated with 1.35 ml. of a 0.18 molar diborane solution in tetrahydrofuran (prepared by the process described by Freeguard et al., Chem. and Ind., 1965, 741). The mixture is allowed to stand for 10 minutes at room temperature, 0.5 ml. of water are added, and the solution is then evaporated under reduced pressure. The resulting solid residue is a mixture of boric acid and a glass-like material containing the crude 7-(2-thienylacetylamino)-desacetyl-isocephalosporanic acid 2,2,2-trichloroethyl ester of the formula

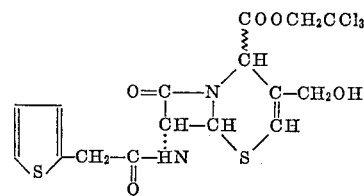

The fraction soluble in methylene chloride shows infrared absorption bands at 2.65μ, 2.95μ, 5.65μ, about 5.7μ and 6.0μ.

The mixture so obtained is dissolved in 2 ml. of acetic anhydride and 1 ml. of pyridine, the mixture is allowed to stand for 5 hours at room temperature and the solvent is then distilled off at 60° C. under reduced pressure. The residue is dissolved in a small amount of toluene and the solvent is again evaporated in order to achieve complete removal of volatile portion. The residue is extracted with 10 ml. of methylene chloride, the insoluble residue is filtered off and the filtrate and the washing liquids are evaporated under reduced pressure. The resulting yellow, glasslike material shows practically only one spot ($R_f$=0.6) apart from a few polar impurities in a thin-layer chromatogram (silica gel plate, 1:1-mixture of benzene and ethyl acetate). The material is chromatographed on 5 g. of acid-washed silica gel (prepared in benzene, dimensions of column: 100× 12 cm.); 10 ml. fractions are eluted. The fractions obtained with 10 ml. of benzene and with 10 ml. of a 3:1-mixture of benzene and ethyl acetate are discarded. The following three fractions of 10 ml. each of a 3:1 mixture of benzene and ethyl acetate elute the pure 7-(2-thienylacetylamino)-isocephalosporanic acid 2,2,2-trichloroethyl ester of the formula

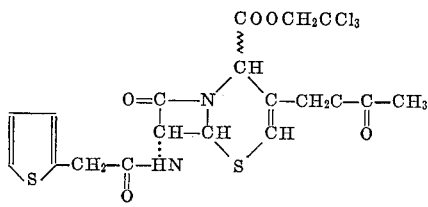

the product resulting from fractions 4 and 5 melting at 102° C. after crystallization from 0.5 ml. of absolute ethanol; $[\alpha]_D$=+320° (c.=1.01 in chloroform); infrared absorption bonds (in methylene chloride) at 2.95μ, 5.65μ, 5.7μ, 5.75μ, 5.97μ, 6.2μ (shoulder), 6.7μ, 7.3μ, 7.65μ, 8.25μ (strong), 8.75μ and 9.75μ.

The desacetyl - 7 - [D-5-(carbo-2,2,2-trichloroethoxy)-5-(2,2,2-trichloroethoxycarbonyl - amino)-valerylamino]-isocephalosporanic acid-2,2,2-trichloroethyl ester is obtained in the same manner from 3-desacetyloxymethyl-3-formyl - 7 - [D-5-(carbo-2,2,2-trichloroethoxy)-5-(2,2,2-trichloroethoxycarbonyl - amino) - valerylamino] - isocephalosporanic acid-2,2,2-trichloroethyl ester by treatment with diborane, and is converted by esterification with acetic anhydride in pyridine into 7-[D-5-(carbo-2,2,2-trichloroethoxy) - 5 - (2,2,2 - trichloroethoxycarbonyl-amino)-valerylamino]-isocephalosporanic acid 2,2,2-trichloroethyl ester of the formula

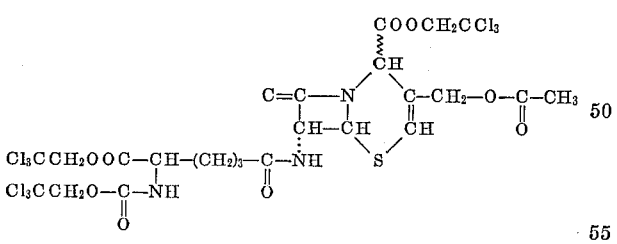

melting at 111 to 114° C. after recrystallization from ethanol; $[\alpha]_D^{20}$=+220° (c.=1.01 in chloroform); infrared absorption bands (in methylene chloride) at 2.95μ, 5.65μ, 5.72μ, 5.80μ, 5.97μ, 6.25μ and 6.7μ; ultra-violet absorption bands (in ethanol) $\lambda_{max}$ 250 mμ ($\epsilon$=8900).

EXAMPLE 2

To a solution of 0.15 g. of 7-(2-thienylacetylamino)-isocephalosporanic acid 2,2,2-trichloroethyl ester in 24 ml. of 90% aqueous acetic acid is added in portions 0.6 g. of zinc dust over a period of 30 minutes; the reaction mixture is stirred for 2 hours at room temperature and then centrifuged. The solution obtained is evaporated several times with the addition of toluene each time and the residue is extracted with 5 ml. of water and 25 ml. of ethyl acetate, 2 N hydrochloric acid being added dropwise until the aqueous phase has a pH of about 2. After washing three times with a saturated sodium chloride solution and drying, the organic solution is evaporated and the residue is crystallized from a mixture of benzene and ethyl acetate. The resulting 7-(2-thienylacetylamino)-isocephalosporanic acid of the formula

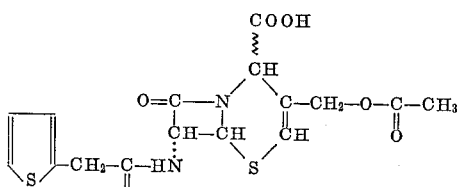

melting at 147 to 151° C.; $[\alpha]_D^{20}$=+440°±3° (c.= 0.364 in chloroform); infra-red absorption bands (potassium bromide) at 2.95μ, 3.06μ, 5.75μ, 5.82μ, 6.05μ and 6.56μ.

EXAMPLE 3

An excess of diazomethane dissolved in ether is added to a solution of 0.004 g. of 7-(2-thienylacetylamino)isocephalosporanic acid in 0.5 ml. of methanol. The evaporated reaction mixture is chromatographed on 1 gram of purified silica gel with a 3:1-mixture of benzene and ethyl acetate, fractions of 2 ml. each being taken. Fractions 3–5 are evaporated and, when crystallized from benzene, the residue yields the pure 7-(2-thienylacetylamino)-isocephalosporanic acid methyl ester of the formula

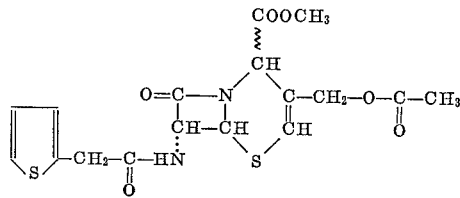

melting at 135 to 136° C.; $[\alpha]_D^{20}$=+387°±2° (c.= 0.663 in chloroform); infra-red absorption bands (in methylene chloride) at 2.95μ, 5.63μ, 5.77μ, 5.95μ, 6.24μ and 6.68μ.

The above ester can also be obtained as follows: A solution of 0.2 g. of 7-(2-thienylacetylamino)-cephalosporanic acid methyl ester in 3 ml. of pyridine is allowed to stand for 7 days at room temperature and is then evaporated several times under reduced pressure with the addition of toluene. The residue is chromatographed on 27 g. of purified silica gel; the column is washed with 525 ml. of a 6:1-mixture of benzene and ethyl acetate and 250 ml. of a 4:1-mixture of benzene and ethyl acetate, 25 ml. fractions being taken. Fractions 9–13 contain starting material, whereas fractions 14–18 yield 7-(2-thienylacetylamino)-isocephalosporanic acid methyl ester which crystallizes from benzene in the form of colourless crystals melting at 132 to 134° C., and which is identical with the product obtained by the above process.

EXAMPLE 4

To a solution of 0.033 g. of 7-(2-thienylacetylamino)-isocephalosporanic acid 2,2,2-trichloroethyl ester in 1.5 ml. of methanol is treated with 0.027 g. of anhydrous sodium acetate and the reaction mixture is stirred for 24 hours at room temperature. The evaporated reaction mixture is extracted with 2 ml. of water and 5 ml. of methylene chloride, the organic phase is isolated, dried and evaporated. The viscous residue is shown by the infra-red and nuclear resonance spectra and thin-layer chromatography to be a 6.5:1-mixture of 7-(2-thienylacetylamino)-isocephalosporanic acid methyl ester and 7-(2-thienylacetylamino)-cephalosporanic acid methyl ester.

EXAMPLE 5

A solution of 0.017 g. of 3-desacetyloxymethyl-3-formyl-7-[D-5 - (carbo-2,2,2-trichloroethoxy) - 5-(2,2,2-trichloroethoxycarbonyl-amino) - valerylamino]-isocephalosporanic acid 2,2,2-trichloroethyl ester in 0.2 ml. of tetrahydrofuran is treated with 0.1 ml. of a 0.18 molar solution of diborane in tetrahydrofuran. After standing for 10 minutes, a drop of water is added and the mixture is evaporated to dryness under reduced pressure. Since the reduction is not complete, the above process is repeated twice using each time 0.17 ml. of the diborane solution. After evaporating under reduced pressure, the crude product, containing the 7-[D-5-(carbo-2,2,2-trichloroethoxy)-5-(2,2,2 - trichloroethoxycarbonyl-amino)-valerylamino]-desacetyl-isocephalosporanic acid 2,2,2-trichloroethyl ester of the formula

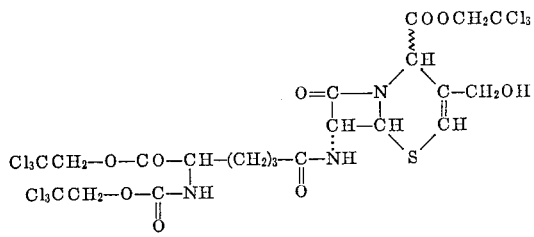

is dissolved in 10 drops of acetic acid anhydride and 5 drops of pyridine; the solution is allowed to stand for 4 hours and evaporated under reduced pressure. The residue is chromatographed on 1 g. of silica gel; at first the column is washed with 10 ml. of benzene and then 5 ml. fractions of a 4:1-mixture of benzene and ethyl acetate are taken. Fractions 4 and 5 are separately taken up in a few drops of benzene; the suspensions are filtered through cotton and the filtrates are evaporated under an atmosphere of nitrogen. Fraction 5 yields a syrup-like product, which crystallizes from a small amount of 70% aqueous ethanol while seeding and scratching. The resulting 7 - [D-5-(carbo-2,2,2-trichloroethoxy)-5-(2,2,2-trichloroethoxycarbonyl-amino)-valerylamino] - isocephalosporanic acid 2,2,2-trichloroethyl ester, M.P. 111–114° C. after recrystallization from ethanol, is identical with the product described in Example 1.

EXAMPLE 6

A freshly prepared solution of 0.021 g. of 7-(2-thienylacetylamino)-isocephalosporanic acid methyl ester in 2 ml. of pyridine is allowed to stand for 7 days at 20° C.; the progress of the reaction is checked by periodic measurements of the optical rotation. After evaporating the solution several times with toluene under reduced pressure, the residue is chromatographed on 3 g. of silica gel, 2.5 ml. fractions of a 6:1 mixture of benzene and ethyl acetate (total volume: 52.5 ml.) and of a 4:1 mixture of benzene and ethyl acetate (total volume: 25 ml.) being taken. Fractions 9 to 13 yield the pure 7-(2-thienylacetylamino)-cephalosporanic acid methyl ester of the formula

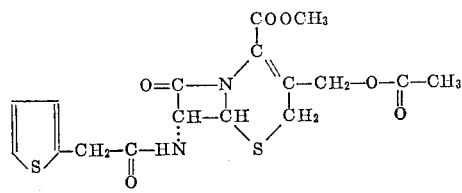

melting at 185 to 185.5° C. after crystallization from methanol; $[\alpha]_D^{20}=+30°\pm1°$ (c.=1.063 in chloroform); infra-red absorption bands (methylene chloride) at 2.95µ, 5.60µ, 5.77µ, 5.93µ and 6.68µ; nonisomerized starting material is isolated from fraction 14–18.

The above isomerization of 7-(2-thienylacetylamino)-isocephalosporanic acid methyl ester can also be carried out in boiling pyridine or by treatment with triethylamine in benzene or acetonitrile at 20° C.

The reaction product can also be obtained in the following manner:

A solution of 0.202 g. of 7-(2-thienylacetylamino)-cephalosporanic acid in 3 ml. of methanol is treated with an excess of a diazomethane solution in ether, a colourless crystalline precipitate being obtained after vigorous evolution of gas. The reaction mixture is then evaporated and the residue is crystallized from methanol; the resulting pure 7-(2-thienylacetylamino)-cephalosporanic acid methyl ester melts at 185 to 185.5° C.

EXAMPLE 7

A solution of 0.033 g. of 7-(2-thienylacetylamino)-isocephalosporanic acid 2,2,2-trichloroethyl ester in 1.5 ml. of methanol is treated with 0.027 g. of anhydrous sodium acetate and the mixture is stirred for 24 hours at room temperature. The evaporated reaction mixture is extracted with 2 ml. of water and 5 ml. of methylene chloride, the organic phase is isolated, dried and evaporated. The viscous residue is shown by the infra-red and nuclear magnetic resonance spectra, as well as by thin-layer chromatography to be a 6.5:1 mixture of 7-(2-thienylacetylamino)-isocephalosporanic acid methyl ester and 7-(2-thienylacetylamino)-cephalosporanic acid methyl ester. The mixture can be resolved into the two compounds by chromatography by the process described in Example 6.

EXAMPLE 8

A solution of 0.0446 g. of 7-(2-thienylacetylamino)-isocephalosporanic acid 2,2,2-trichloroethyl ester in 7 ml. of pyridine is allowed to stand for 3 days, the constant optical rotation being $[\alpha]_D=+249°\pm1°$, and is then evaporated several times under reduced pressure each time with the addition of toluene. Thin-layer chromatography and nuclear magnetic resonance spectra show the product obtained to be a mixture of 7-(2-thienylacetylamino)-cephalosporanic acid 2,2,2-trichloroethyl ester of the formula

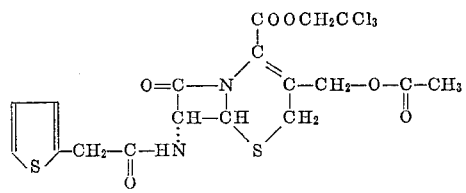

and 7 - (2 - thienylacetylamino) - isocephalosporanic acid 2,2,2-trichloroethyl ester. The mixture is separated by chromatography on 3.5 g. of purified silica gel, elution being carried out with 70 ml. of a 9:1-mixture of benzene and ethyl acetate and 20 ml. of a 3:1-mixture of benzene and ethyl acetate and 5 ml. fractions being taken. The desired 7-(2-thienylacetalamino)-cephalosporanic acid 2,2,2-trichloroethyl ester is obtained from fractions 5–9 and melts at 120 to 123° C. after being crystallized twice from a small amount of benzene; $[\alpha]_D^{20}=+14°\pm2°$ (c.=0.95 in chloroform); infra-red absorption bands (in methylene chloride) at 2.95µ, 5.60µ, 5.77µ, 5.93µ and 6.70µ. The subsequent fractions contain mixtures of the two products and pure 7-(2-thienylacetylamino)-isocephalosporanic acid 2,2,2-trichloroethyl ester.

The desired 7-(2-thienylacetylamino)-cephalosporanic acid 2,2,2-trichloroethyl ester can also be obtained as follows: A solution of 1.94 g. of 7-(2-thienylacetylamino)-cephalosporanic acid in 15 ml. of anhydrous tetrahydrofuran is mixed with 1 g. of dicyclohexylcarbodimide in 5 ml. of tetrahydrofuran; colourless crystals begin to precipitate after about 5 minutes. After stirring 1½ hours at room temperature 15 ml. of 2,2,2-trichloroethanol are added, the solution is stirred for 70 hours at room temperature and is then evaporated in an oil pump vacuum. The residue is chromatographed on 100 g. of silica gel and eluted with 1460 ml. of a 9:1-mixture of benzene and ethyl acetate and 550 ml. of a 3:1-mixture of of benzene and ethyl acetate, 100 ml. fractions being taken. Fractions 7–13 contain 7-(2-thienylacetylamino)-cephalosporanic acid 2,2,2-trichloroethyl ester, which melts at 120 to 123° C. after being crystallized twice from a small amount of benzene.

EXAMPLE 9

A freshly prepared solution of 0.01185 g. of 7-(2-thienylacetylamino)-isocephalosporanic acid 2,2,2-trichloroethyl ester in 20 ml. of γ-picoline (distilled over barium oxide) is allowed to stand for 2 days at 20° C. and is then evaporated several times under reduced pressure with the addition of toluene each time. Thin-layer chromatography and the nuclear magnetic resonance spectra show the resulting product to be a mixture of 7-(2-thienylacetylamino)-cephalosporanic acid 2,2,2-trichloroethyl ester and starting material; the mixture is separated according to the process described in Example 6.

EXAMPLE 10

A solution of 0.012 g. of 7-(2-thienylacetylamino)-isocephalosporanic acid 2,2,2-trichloroethyl ester in 1 ml. of pyridine is boiled under reflux for 2 hours and subsequently evaporated several times with the addition of toluene. Thin-layer chromatography and the nuclear magnetic resonance spectra show the residue to be a mixture of 7-(2-thienylacetylamino)-cephalosporanic acid 2,2,2-trichloroethyl ester and starting material, which mixture is separated by the process described in Example 8.

EXAMPLE 11

A solution of 0.1 g. of 7-(2-thienylacetylamino)-cephalosporanic acid 2,2,2-trichloroethyl ester in 1.8 ml. of 90% aqueous acetic acid is treated with 0.4 g. of zinc duct added in portions in the course of 30 minutes; the reaction mixture is stirred at room temperature for 2 hours and then centrifuged. The clear solution is evaporated several times with the addition of toluene each time, the residue is shaken with 5 ml. of water and 25 ml. of toluene, and treated dropwise with 2 N hydrochloric acid until the aqueous phase has a pH of about 2. After washing three times with a saturated sodium chloride solution and drying, the organic phase is evaporated and the residue is crystallized from a mixture of benzene and ethyl acetate to yield the 7-(2-thienylacetylamino)-cephalosporanic acid of the formula

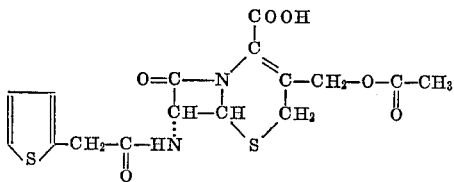

melting at 160–160.5° C.; $[\alpha]_D^{20} = +50°$ (c.=1.03 in acetonitrile); infra-red absorption bands (potassium bromide) at 3.10μ, 5.65μ, 5.75μ, 6.05μ and 6.55μ; ultra-violet absorption bands (in ethanol) $\lambda_{max}$ 239 mμ (ε=15600) and 262 mμ (ε=7750).

EXAMPLE 12

A freshly prepared solution of 0.2 g. of 7-[5-(carbo-2,2,2-trichloroethoxy)-5-(2,2,2-trichloroethoxycarbonyl-amino)-valerylamino]-isocephalosporanic acid 2,2,2-trichloroethyl ester in 3 ml. of pyridine is allowed to stand for 4 days at 20° C. After evaporating the solution three times under reduced pressure the solution with 3 ml. of toluene each time, the residue is chromatographed on 60 g. of purified silica gel, elution being carried out with 600 ml. of 4:1-mixture and 100 ml. of a 3:1-mixture of benzene and ethyl acetate, and 30 ml. fractions being taken. Fractions 12–14 yield the pure 7-[D-5-(carbo-2,2,2-trichloroethoxy)-5-(2,2,2-trichloroethoxy-carbonyl-amino)-valerylamino]-cephalosporanic acid 2,2,2-trichloroethyl ester of the formula

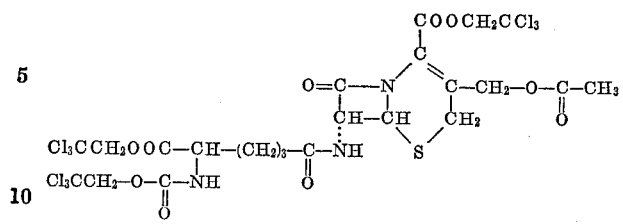

melting at 157 to 159° C. after recrystallization from carbon tetrachloride; $[\alpha]_D^{20} = +40°$ (c.=0.76 in chloroform); infra-red absorption bands (in methylene chloride) at 2.95μ, 5.63μ, 5.76μ, 5.95μ, 6.1μ and 6.7μ; ultraviolet absorption band (in ethanol) $\lambda_{max}$ 266 mμ (ε=8600). Fractions 17–23 yield the starting material which melts at 111 to 114° C. after recrystallization from absolute ethanol.

EXAMPLE 13

A solution of 0.3 g. of 7-[5-(carbo-2,2,2-trichloroethoxy)-5-(2,2,2-trichloroethoxycarbonyl-amino)-valerylamino]-cephalosporanic acid 2,2,2-trichloroethyl ester in 7.2 ml. of acetic acid of 90% strength, is treated with 1.8 g. of zinc dust, added in portions; the mixture is stirred for 2 hours at room temperature. After centrifuging, the clear supernatent solution is evaporated, the residue is dissolved in 0.5 ml. of water and the solution is filtered through a column of 2 g. of an ion exchange preparation (Amberlite IR 45; acetate form). The column is washed with 20 ml. of water, the filtrate is allowed to pass through a column of 5 g. of another ion exchange preparation (Dowex 50X12) and evaporated under reduced pressure. The crude product yields cephalosporin C of the formula

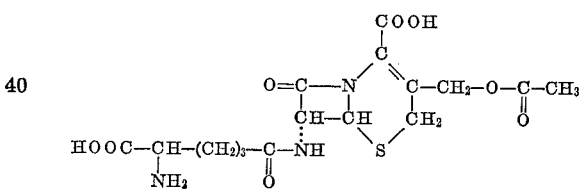

decomposing at 173 to 175° C., after recrystallization from water and acetone; infra-red absorption bands (in paraffin oil) at 2.94μ, 3.06μ, 5.77μ, 6.05μ, 6.29μ, 6.57μ, 7.17μ, 7.36μ and 7.61μ. It can be isolated and purified in a known manner over the barium salt.

In the paper chromatographic systems n-butanol:acetic acid:water (5:1:4), n-propanol:ethyl acetate:water (7:1:2) and n-propanol:water (7:1) the product is identical with the cephalosporin C obtained by fermentation.

The above reduction of 7-[D-5-(carbo-2,2,2-trichloroethoxy)-5-(2,2,2-trichloroethoxycarbonyl-amino)-valerylamino]-cephalosporanic acid 2,2,2-trichloroethylester with zinc in acetic acid of 90% strength is also carried out advantageously at 0° C.

EXAMPLE 14

2,2,2-trichloroethylester derivatives of cephalosporanic C, obtainable according to the present process, are especially suitable as intermediate products for the preparation of 7-amino-cephalosporanic acid and its splittable esters, especially 2,2,2-trichloroethyl or diphenyl-methyl esters. Thus, for example, a diester of cephalosporin C, especially suitable for splitting off an esterified 5-amino-5-carboxy-valeryl residue, and particularly the bis-diphenyl-methyl ester of cephalosporin C, can be obtained in excellent yield and purity by esterifying with an esterifying agent, especially with diphenyl-diazomethane, according to methods in themselves known both carboxyl groups present in 7-[D-5-carboxy-5-(2,2,2-trichloroethyloxycarbonyl-amino)-valerylamino]-cephalosporanic acid (obtained by treating the sodium salt of cephalosporin C with chloroformic acid 2,2,2-trichloroethyl ester) and converting in the resulting 7-[D-5-carboxy-5-(2,2,2-trichloroethyloxy - carbonylamino) - valerylamino] - cephalosporanic acid diester, particularly the diphenylmethyl diester, the 2,2,2-trichloroethyloxycarbonyl-amino group into an amino group by reduction as described above, for example, by treatment with zinc dust in the presence of acetic acid of 90% strength. The splitting of the resulting cephalosporin C diester, such as the diphenyl methyl ester to the 7-amino-cephalosporanic acid ester may be carried out, for example, in inert solvents, such as chlorinated hydrocarbons, particularly chlorinated lower alkanes, such as methylenechloride, chloroform, carbon tetrachloride, and also, for example, benzene, nitromethane or dioxane, the diester being present preferably in a high dilution (about 0.2 to 1%). The reaction is preferably carried out at room temperature and in the presence of an acid or acid and base as catalyst.

Cephalosporin C bis-2,2,2-trichloroethylester may also be split by treatment with an inert solvent in the above mentioned way to yield the 7-amino-cephalosporanic acid 2,2,2-trichloroethyl ester and is, therefore, also an excellent intermediate product for the preparation of 7-amino-cephalosporanic acid. This diester is obtained in a simple manner by treating 7-[D-5-(carbo-2,2,2-trichloroethoxy)-5-(tert.-butyloxycarbonylamino) - valeryl - amino]-cephalosporanic acid 2,2,2-trichloroethyl ester with an acidic agent, for example, trifluoroacetic acid; the starting material is formed, for example, by esterifying both carboxyl groups present in 7-[D-5-carboxy-5-tert.-butyloxycarbonyl-amino-valeryl-amino)-cephalosporanic acid with 2,2,2-trichloroethanol in the presence of a condensing agent, such as dicyclohexylcarbodiimide.

In the 7-amino-cephalosporanic acid acid esters resulting after splitting off the esterified 5-carboxy-5-amino-valeryl residue the esterified carboxyl group may be converted in the free carboxyl group, a diphenyl-methyl ester, for example, by treatment with an acid agent, such as trifluoracetic acid, advantageously in the presence of anisole, or a 2,2,2-trichloroethyl ester by reduction, such as by the methods referred to above, for example, by treatment with zinc dust in the presence of aqueous acetic acid.

The above processes are more closely described in the following example:

A solution of 4.25 g. of the sodium salt of cephalosporin C and 2.1 g. of sodium hydrogen carbonate in 10 ml. of water is treated dropwise and while stirring in the course of 30 minutes with a solution of 2.5 of chloroformic acid 2,2,2-trichloroethyl ester in 4 ml. of acetone and the mixture is then stirred at 20° C. for 2 hours. After diluting the mixture with about 30 ml. of water the acetone is removed under reduced pressure. The aqueous phase is washed three times with ethyl acetate, then acidified with concentrated phosphoric acid to pH-value of 2, saturated with sodium chloride, and extracted three times with ethyl acetate. The organic solution is dried over sodium sulphate and evaporated to yield the 7-[D-5-(2,2,2-trichloroethoxycarbonyl-amino) - 5 - carboxy-valeryl-amino]-cephalosporanic acid of the formula

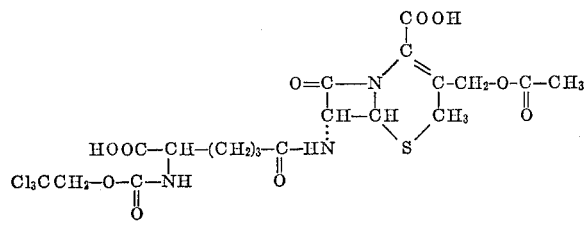

A solution of 4 g. of 7-[D-5-(2,2,2-trichloroethoxycarbonyl-amino) - 5 - carboxy-valeryl-amino]cephalosporanic acid in 40 ml. of an 8:2-mixture of dioxane and methanol is treated while stirring at 20° C. with a filtered solution of 3.5 g. of diphenyl-diazomethane and 25 ml. of petroleum ether. After allowing the mixture to stand for 1 hour at 20° C., it is evaporated under reduced pressure. The residue is digested several times with 50 ml. of 1:1-mixtures of petroleum ether and ether on each occasion and is then dissolved in ethyl acetate. The organic solution is washed with phosphoric acid of 10% strength and a solution of disodium hydrogen phosphate of 10% strength, dried over sodium sulphate and evaporated. There is obtained the 7-[D-5-(carbo-diphenylmethoxy)-5-(2,2,2 - trichloroethyloxycarbonyl-amino) - valeryl-amino]cephalosporanic acid diphenylmethyl ester of the formula

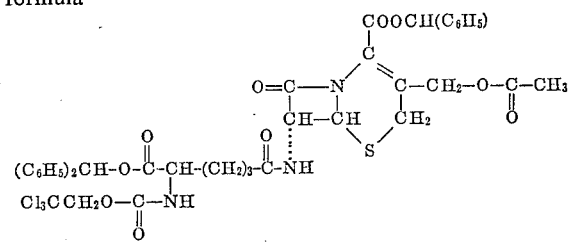

$[\alpha]_D^{20} = +24° \pm 1°$ (c.=1 in chloroform), which is used without further purification.

A mixture of 4 g. of 7-[D-5-(carbo-diphenylmethoxy)-5-(2,2,2 - trichloroethoxycarbonyl-amino)-valerylamino]-cephalosporanic acid diphenylmethyl ester in 40 ml. of acetic acid of 90% strength is mixed, while stirring, in portions with a total of 25 g. of zinc dust; the reaction mixture is stirred for 2 hours at room temperature, then diluted with water, and extracted three times with ethyl acetate. The purified organic extracts are washed with a cold solution of sodium hydrogen carbonate and with water, dried over sodium sulphate, and evaporated under reduced pressure to yield the cephalosporin C bis-diphenylmethyl ester of the formula

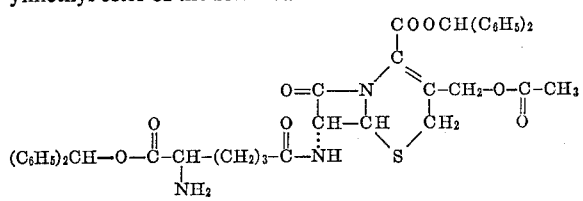

which can be split for furnishing the 7-amino-cephalosporanic acid as follows:

A solution of 12.6 g. of cephalosporin C bis-diphenyl-methyl ester in 2000 ml. of absolute methylene chloride is treated with 2 ml. of 2 N aqueous acetic acid; the mixture is allowed to stand in the dark at 22° C. for 8 days and is then evaporated under reduced pressure and the residue is taken up in a mixture of 5 parts of toluene, 2 parts of ethyl acetate, 3 parts of alcohol and 3 parts of 2 N aqueous hydrochloric acid. After agitating vigorously to bring about complete dissolution, the phases are separated and the lower phase is extracted by agitation with two further upper phases (5 parts of toluene and 2 parts of ethyl acetate). The three upper phases are further extracted four times with a 1:1-mixture of ethanol and 2 N-hydrochloric acid. The lower phases containing the product are combined, adjusted to a pH-value of 6 with a 50% aqueous solution of tripotassium phosphate and freed from ethanol in vacuo. The mixture is then adjusted to a pH-value of 8.0 with the tripotassium phosphate solution and extracted three times with ethyl acetate. After being dried over sodium sulphate, the extract is evaporated to yield the 7-amino-cephalosporanic acid benzhydryl ester, which crystallizes from ether in the form of needles united in clusters; M.P. 122–124° C.; it exhibits in the thin layer chromatogram on silica gel in the system of n-butanol-glacial acetic acid (10:1) saturated with water, an $R_f$-value of 0.64 (dirty yellow speaks with ninhydrin-collidin).

In order to convert the ester into free 7-amino-cephalosporanic acid, 6.8 g. (=1 part) of the ester are dissolved in 1 part of anisole, and 5 parts of trifluoroacetic acid are added. The mixture is then evaporated immediately under a pressure of 0.2 mm. Hg in the course of 20 minutes, the residue is taken up in 30 ml. of ethyl acetate, and the solution is poured simultaneously with about 13 ml. of aqueous trisodium phosphate solution of 50% strength, into 20 ml. of a 3% aqueous dipotassium hydrogen phosphate solution while stirring. The two liquid streams are so controlled that the pH-value is maintained between 6 and 8, and finally remains constant at 7. The aqueous phase is separated and washed twice with 10 ml. of ethyl acetate on each occasion, and the three organic phases are washed twice with 5 ml. of a 3% aqueous dipotassium hydrogen phosphate solution on each occasion. The organic phases are discarded, the aqueous phases are combined and adjusted to a pH-value of 3.5 with about 4 ml. of concentrated hydrochloric acid. The precipitate resulting after standing at 0° C. is filtered off, washed with a small amount of ice-water and dried to yield the pure 7-amino-cephalosporanic acid.

In a similar manner 7-amino-cephalosporanic acid and its 2,2,2-trichloroethyl ester can be obtained by starting from 7 - (D - 5 - carboxy - 5 - tert.-butyloxycarbonamino-valeryl-amino)-cephalosporanic acid, converting it by esterification with 2,2,2-trichloroethanol in the presence of dicyclohexylcarbodiimide into the 7-[D-5-tert.-butyloxycarbonyl - amino-5-(carbo-2,2,2-trichloroethoxy) - valeryl-amino]-cephalosporanic-acid 2,2,2-trichloroethyl ester, splitting the tert.-butyloxycarbonyl-amino group of the latter by treatment with trifluoroacetic acid and converting the resulting cephalosporin C bis-2,2,2-trichloroethyl ester in methylene chloride in the presence of a catalytic quantity of acetic acid into 7-amino-cephalosporanic acid 2,2,2-trichloroethyl ester. 7-amino-cephalosporanic acid is obtained from the latter by treatment with zinc in the presence of acetic acid of 90% strength.

The starting material used in the above modification is obtained, for example, as follows:

The solution of 9.43 g. of cephalosporin C in 250 ml. of a 1 N aqueous solution of sodium hydrogen carbonate is mixed with 3.62 ml. of tert.-butyloxycarbonyl-azide, dissolved in 150 ml. of dioxane, and the mixture is stirred for 5 hours at 40° C. The solution is then concentrated at a pressure of 0.5 mm. Hg and at 30° C. to about 150 ml., and the concentrated solution is diluted with 200 ml. of water and extracted several times with ethyl acetate. The aqueous phase is saturated with sodium chloride and then exhaustively extracted in the cold with ethyl acetate at a pH of 2.0. The organic extract is washed with saturated sodium solution, then dried over sodium sulphate and evaporated under reduced pressure to yield amorphous colourless N-tert.-butyloxycarbonyl-cephalosporin C; $R_f$-value in paper chromatography in the system of n-butanol acetic acid (10:1), saturated with water; 0.80; and in the system water saturated n-butanol plus 1% glacial acetic acid: 0.51.

EXAMPLE 15

A solution of 3.45 g. of 7-[D-5-(2,2,2-trichloroethoxycarbonyl - amino) - 5 - carboxy-valeryl-amino]-cephalosporanic acid in a mixture of 5 ml. of 2,2,2-trichloroethanol, 10 ml. of tetrahydrofuran and 1.5 ml. of pyridine is treated dropwise while stirring and cooling with cold water with a solution of 2.55 g. of dicyclohexylcarbondiimide in 5 ml. of tetrahydrofuran. A precipitate begins to form; the mixture is allowed to stand for 20 minutes and is then evaporated to dryness under the vacuum of an oil pump. The residue is triturated three times with portions of 15 ml. each of benzene and the benzene-isoluble N,N'-dicyclo hexyl-urea, M.P. 120° C., is filtered off and the clear solution is evaporated to dryness with the help of an oil diffusion pump. The viscous residue in 50 ml. of a 4:1-mixture of benzene and ethyl acetate is chromatographed on a column of 500 g. of silica gel (acid washed; the column is prepared in a 4:1-mixture of benzene and ethyl acetate). The column is elutated with 6300 ml. of a 4:1-mixture of benzene and ethyl acetate and 900 ml. of a 3:1-mixture of benzene and ethyl acetate, fractions of 300 ml. each being taken.

The combined fractions 11–15 are evaporated; they contain apart from the 7-[D-5-(carbo-2,2,2-trichloroethoxy)-5-(2,2,2-trichloroethoxycarbonyl-amino) - valeryl-amino]-cephalosporanic acid 2,2,2-trichloroethyl ester a small amount of N,N'-dicyclohexyl-urea. The residue is chromatographed on 60 g. of silica gel (acid-washed), elution being carried out with a 3:1-mixture of benzene and ethyl acetate and 50 ml. fractions being taken. Fractions 4–7 yield the 7-[D-5-(carbo-2,2,2-trichloroethoxy)-5 - (2,2,2 - trichloroethoxycarbonyl - amino) - valeryl-amino]-cephalosporanic acid 2,2,2-trichloroethyl ester as a viscous oil, which crystallizes from carbon tetrachloride and melts at 157–159° C. after three recrystallizations from the same solvent. The product is obtained in great crystals after a further crystallization from 1 ml. of ethanol while standing for 20 hours at room temperature, M.P. 157–159° C. after drying at 60° C./0.01 mm. Hg during 20 hours.

The combined fractions 17–24, containing, apart from some N,N'-dicyclohexylcarbodiimide, the 7-[D-5-(carbo-2,2,2 - trichloroethoxy)-5-(2,2,2-trichloroethoxycarbonyl-amino)-valeryl-amino]-isocephalosporanic acid 2,2,2-trichloroethyl ester are evaporated. The solution resulting after filtering the residue in 10 ml. of a 3:1-mixture of benzene and ethyl acetate is chromatographed on 100 g. of silica gel (acid-washed, the column is prepared in a 3:1-mixture of benzene and ethylacetate), fractions of 150 ml. being taken. After evaporating, the fractions 3–5 yield the 7-[D-5-(carbo-2,2,2-trichloroethoxy)-5-(2,2,2-trichloroethoxycarbonyl - amino) - valeryl - amino]iso-cephalosporanic acid 2,2,-trichloroethyl ester as a viscous oil, which crystallizes from 1 ml. of absolute ethanol after stnading for 16 hours at room temperature and melts at 111–114° C. after 2 crystallizations from the same solvent; a further crystallization from absolute ethanol yields after drying at 60° C./0.01 mm. Hg for 20 hours a product, which also melts at 111–114° C.

EXAMPLE 16

A solution of 0.2 g. 7 - [D - 5-(carbo-2,2,2-trichloroethoxy) - 5 - (2,2,2 - trichloroethoxycarbonyl - amino)-valeryl-amino]-iscephalosporanic acid 2,2,2-trichloroethyl ester in 3 ml. dry pyridine is allowed to stand at room temperature for 4 hours and is then three times carefully evaporated under reduced pressure while adding each time 3 ml. of toluene. The residue is chromatographed on 60 g. of silica gel (acid-washed), elution being carried out with 600 ml. of a 4:1-mixture of benzene and ethyl acetate and 100 ml. of a 3:1-mixture of benzene and ethyl acetate and fractions of 30 ml. being taken.

Fractions 12–14 yield the pure, but viscous 7-[D-5-(carbo - 2,2,2 - trichloroethoxy) - 5 - (2,2,2-trichloroethoxycarbonyl - amino)-valeryl-amino]-cephalosporanic acid 2,2,2-trichloroethyl ester, which crystallizes from carbon tetrachloride, M.P. 157–159° C. Fractions 17–23 yield the pure, viscous 7-[D-5-(carbo-2,2,2-trichloroethoxy) - 5 - (2,2,2 - trichloroethoxycarbonyl-amino)-valeryl - amino] - isocephalosporanic acid 2,2,2-trichloroethyl ester, which melts at 111–114° C. after crystallization from ethanol.

What is claimed is:

1. A process for the manufacture of a member selected from the group consisting of 7-amino-desacetyl-isocephalosporanic acids and acyl derivatives thereof, which comprises reducing in a member selected from the group consisting of a 7-amino-3-desacetyloxymethyl-3-formyl-isocephalosporanic acid, 7 - (N - acyl-amino)-3-desacetyloxymethyl - 3 - formyl - isocephalosporanic acids and 7-(N-acyl - amino) - 3 - desacetyloxymethyl - 3 - formyl-iso-cephalosporanic acid esters the formyl group into a hydroxymethyl group by treatment with a boron hydride.

2. Process as claimed in claim 1, wherein diborane is used as the boron hydride.

3. A process for the manufacture of a member selected from the group consisting of 7-amino-desacetyl-cephalosporanic acids and acyl derivatives thereof, which comprises isomerizing a member selected from the group consisting of 7-amino-desacetyl-isocephalosporanic acid, a 7 - (N - acylamino)-desacetyl-isocephalosphoranic acid, a 7-amino-desacetyl-O-acyl-isocephalosporanic acid and a 7 - (N - acylamino) - desacetyl - O - acyl-isocephalosporanic acid and esters of such acids by treatment with a weakly basic reagent in an anhydrous medium and separating the corresponding cephalosporanic acid.

4. Process as claimed in claim 3, wherein the weakly basic agent is a base selected from the group consisting of a pyridine-type base, an aniline-type base and a salt of a weak to medium-strong base with a weak acid.

5. A compound having the formula

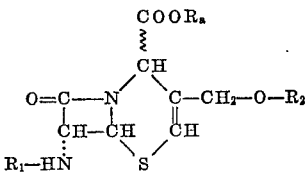

in which each of the groups $R_1$ and $R_2$ is a member selected from the group consisting of hydrogen and an acyl radical derived from a member selected from the group consisting of lower alkane carboxylic acid, cyclo-lower alkane carboxylic acid, benzoic acid, phenyl-lower alkane carboxylic acid, phenyl-lower alkene carboxylic acid, pyridine carboxylic acid, thiophene carboxylic acid, furane carboxylic acid, pyridyl-lower alkane carboxylic acid, thienyl-lower alkane carboxylic acid, furyl-lower alkane carboxylic acid, carbonic acid lower alkyl ester, and each of said acids substituted by a member selected from the group consisting of lower alkyl, lower alkoxy, halogen, trifluoromethyl, mercapto, lower alkyl-mercapto, nitro, amino, carboxy, carbo-lower alkoxy, cyano and sulfonyl, formic acid, carbamic acid and carbamic acid substituted by a member selected from the group consisting of lower alkyl, lower alkoxy, carboxy, carbo-lower alkoxy and chloro-lower alkyl, and $R_a$ is 2,2,2-trichloroethyl.

6. A compound as claimed in claim 5 and being a compound of the formula

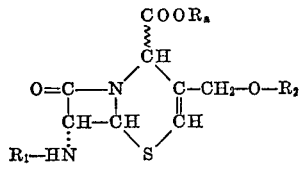

wherein $R_1$ is a member selected from the group consisting of hydrogen, thienylacetyl, cyanoacetyl, chloroethyl-carbamyl, phenylacetyl, 5-amino-5-carboxy-valeryl, tert.-butoxy-carbonyl and 4-nitrobenzoyl, $R_2$ stands for a member selected from the group consisting of hydrogen and lower alkanoyl and $R_a$ is a member selected from the group consisting of 2,2,2-trichloroethyl.

7. A compound as claimed in claim 5 and being 7-(2-thienylacetylamino) - isocephalosporanic acid 2,2,2 - trichloroethyl ester.

8. A compound having the formula

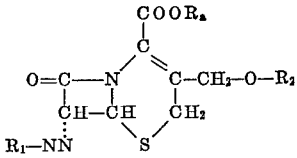

in which each of the groups $R_1$ and $R_2$ is a member selected from the group consisting of hydrogen and an acyl radical derived from a member selected from the group consisting of lower alkane carboxylic acid, cyclo-lower alkane carboxylic acid, benzoic acid, phenyl-lower alkane carboxylic acid, phenyl-lower alkene carboxylic acid, pyridine carboxylic acid, thiophene carboxylic acid, furane carboxylic acid, pyridyl-lower alkane carboxylic acid, thienyl-lower alkane carboxylic acid, furyl-lower alkane carboxylic acid, carbonic acid lower alkyl ester, and each of said acids substituted by a member selected from the group consisting of lower alkyl, lower alkoxy, halogen, trifluoromethyl, mercapto, lower alkyl-mercapto, nitro, amino, carboxy, carbo-lower alkoxy, cyano and sulfonyl, formic acid, carbamic acid and carbamic acid substituted by a member selected from the group consisting of lower alkyl, lower alkoxy, carboxy, carbo-lower alkoxy and chloro-lower alkyl, and $R_a$ represents 2,2,2-trichloroethyl.

9. A compound as claimed in claim 8 and having the formula

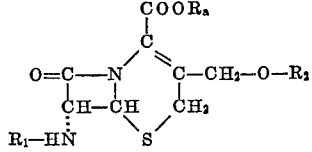

wherein $R_1$ is a member selected from the group consisting of hydrogen, thienylacetyl, cyanoacetyl, chloroethylcarbamyl, phenylacetyl, 5 - amino - 5 - carboxy-valeryl, tert.-butoxy-carbonyl and 4-nitrobenzoyl, $R_2$ stands for a member selected from the group consisting of hydrogen and lower alkanoyl, and $R_a$ represents 2,2,2-trichloroethyl.

10. A compound as claimed in claim 8 and being 7-(2-thienylacetylamino)-cephalosporanic acid 2,2,2-trichloroethyl ester.

11. A compound as claimed in claim 8 and being 7-amino-cephalosporanic acid 2,2,2-trichloroethyl ester.

No references cited.

NICHOLAS S. RIZZO, *Primary Examiner.*

U.S. Cl. X.R.
424—246

CASE WO-13/WO-14/1+2/E

PO-1050
(5/69)

UNITED STATES PATENT OFFICE
CERTIFICATE OF CORRECTION

Patent No. 3,449,336          Dated  June 10, 1969

Inventor(s)      ROBERT BURNS WOODWARD

It is certified that error appears in the above-identified patent and that said Letters Patent are hereby corrected as shown below:

Column 20, line 13, in formula of claim 8

"$R_1-NN$"          should read     --- $R_1-HN$ ---

SIGNED AND
SEALED
NOV 24 1970

(SEAL)
Attest:

Edward M. Fletcher, Jr.
Attesting Officer

WILLIAM E. SCHUYLER, JR.
Commissioner of Patents